(12) United States Patent
Chen et al.

(10) Patent No.: US 10,703,901 B2
(45) Date of Patent: Jul. 7, 2020

(54) GLASS FIBER-REINFORCED FLAME RETARDANT PBT COMPOSITION AND PREPARATION METHOD THEREOF

(71) Applicant: Kingfa Sci. & Tech. Co., Ltd., Guangzhou (CN)

(72) Inventors: Rui Chen, Guangzhou (CN); Wen Zhu, Guangzhou (CN); Wei Chen, Guangzhou (CN); Feng Chen, Guangzhou (CN); Xuejun Fu, Guangzhou (CN); Donghai Sun, Guangzhou (CN); Nanbiao Ye, Guangzhou (CN)

(73) Assignee: Kingfa Sci. & Tech. Co., Ltd., Guangzhou (CN)

( * ) Notice: Subject to any disclaimer, the term of this patent is extended or adjusted under 35 U.S.C. 154(b) by 82 days.

(21) Appl. No.: 15/761,333

(22) PCT Filed: Nov. 16, 2016

(86) PCT No.: PCT/CN2016/106105
§ 371 (c)(1),
(2) Date: Mar. 19, 2018

(87) PCT Pub. No.: WO2017/088692
PCT Pub. Date: Jun. 1, 2017

(65) Prior Publication Data
US 2018/0273745 A1    Sep. 27, 2018

(30) Foreign Application Priority Data

Nov. 24, 2015   (CN) ............... 2015 1 0820955

(51) Int. Cl.
| | |
|---|---|
| C08L 67/02 | (2006.01) |
| C08J 3/215 | (2006.01) |
| C08J 5/04 | (2006.01) |
| C08K 3/22 | (2006.01) |
| C08L 25/18 | (2006.01) |

(52) U.S. Cl.
CPC ............ C08L 67/02 (2013.01); C08J 5/043 (2013.01); C08J 3/215 (2013.01); C08J 2367/02 (2013.01); C08J 2425/18 (2013.01); C08J 2463/00 (2013.01); C08K 3/2279 (2013.01); C08L 25/18 (2013.01); C08L 2201/02 (2013.01); C08L 2205/08 (2013.01)

(58) Field of Classification Search
CPC .. C08L 67/02; C08L 2201/02; C08L 2205/08; C08L 25/18; C08L 2201/12; C08J 5/043; C08J 3/215; C08J 2367/02; C08J 2425/18; C08J 2463/00; C08K 3/22; C08K 5/134; C08K 5/1535; C08K 7/14; C08K 13/02; C08K 3/2279
USPC ........................................... 524/409
See application file for complete search history.

(56) References Cited

U.S. PATENT DOCUMENTS

2007/0197738 A1    8/2007   Ramaraju et al.

FOREIGN PATENT DOCUMENTS

| CN | 101225220 A | * | 7/2008 |
|---|---|---|---|
| CN | 101389687 A | | 3/2009 |
| CN | 102911486 A | | 2/2013 |
| CN | 105385119 A | | 3/2016 |
| JP | 2004075756 A | | 3/2004 |
| JP | 2004091583 A | | 3/2004 |
| JP | 2005154570 A | | 6/2005 |
| WO | 2017088692 | | 6/2017 |

OTHER PUBLICATIONS

CN 101225220 A , machine translation, EPO Espacenet. (Year: 2008).*

* cited by examiner

*Primary Examiner* — Josephine L Chang
(74) *Attorney, Agent, or Firm* — JCIPRNET

(57) ABSTRACT

The present invention discloses a glass fiber-reinforced flame retardant PBT composition which includes following components in parts by weight: 35 to 71 parts of a PBT resin; 5 to 30 parts of a flame retardant; and 5 to 50 parts of a glass fiber; based on a total weight of the glass fiber-reinforced flame retardant PBT composition, a content of tetrahydrofuran is less than/equal to 500 ppm and more than/equal to 10 ppm. In the present invention, when the content of tetrahydrofuran which is selected to be added in a formula of the glass fiber-reinforced flame retardant PBT composition, is less than/equal to 500 ppm and more than/equal to 10 ppm based on the total weight of the glass fiber-reinforced flame retardant PBT composition, a flowability and injection molding appearance of the glass fiber-reinforced flame retardant PBT composition can be apparently improved.

18 Claims, No Drawings

GLASS FIBER-REINFORCED FLAME RETARDANT PBT COMPOSITION AND PREPARATION METHOD THEREOF

CROSS REFERENCE TO RELATED APPLICATIONS

The present application is a national phase entry under 35 U.S.C. § 371 of International Application No. PCT/CN2016/106105, filed Nov. 16, 2016, which claims priority from Chinese Patent Application No. 201510820955.6 filed Nov. 24, 2015, all of which are hereby incorporated herein by reference.

TECHNICAL FIELD

The present invention relates to a PBT composition, and specifically relates to a glass fiber-reinforced flame retardant PBT composition with an excellent flowability and good injection molding appearance, and a preparation method thereof.

BACKGROUND

Polybutylene terephthalate (PBT) is a semi-crystallographic engineering plastic, possessing a good mechanical property, an electrical property, heat resistance, chemical resistance and the like, and it is extensively applied in industries such as automobile, electronic and electrical appliances. However, still there are drawbacks in PBT, for example a poor flowability and poor injection molding appearance quality of a PBT injection molded part, thus limiting the application of PBT in the above-mentioned industries.

Under a condition that the mechanical and processing properties of a PBT material are not influenced, it has been always a difficult problem in the industry to make the injection molded part satisfy a requirement of improving the flowability and the appearance quality.

So far, there's no report about an influence of a content of tetrahydrofuran on the flowability and the injection molding appearance of the PBT composition.

Through a large number of experiments, the inventors surprisingly found that when the content of tetrahydrofuran which is selected to be added in a formula of a glass fiber-reinforced flame retardant PBT composition, is less than/equal to 500 ppm and more than/equal to 10 ppm based on a total weight of the glass fiber-reinforced flame retardant PBT composition, the flowability and the injection molding appearance of the glass fiber-reinforced flame retardant PBT composition can be apparently improved.

SUMMARY OF THE INVENTION

In order to overcome deficiencies and drawbacks in the prior art, a primary objective of the present invention is to provide a glass fiber-reinforced flame retardant PBT composition with an excellent flowability and good injection molding appearance.

Another objective of the present invention is to provide a preparation method for the above-described glass fiber-reinforced flame retardant PBT composition.

The objectives of the present invention are realized by following technical solution:

a glass fiber-reinforced flame retardant PBT composition, comprising following components in parts by weight:

| a PBT resin | 35 to 71 parts; |
|---|---|
| a flame retardant | 5 to 30 parts; and |
| a glass fiber | 5 to 50 parts. |

Preferably, the glass fiber-reinforced flame retardant PBT composition comprises the following components in parts by weight:

| the PBT resin | 40 to 57 parts; |
|---|---|
| the flame retardant | 9 to 23 parts; and |
| the glass fiber | 10 to 40 parts; | based on a total weight of the glass fiber-reinforced flame retardant PBT composition, a content of tetrahydrofuran is less than/equal to 500 ppm and more than/equal to 10 ppm.

Particularly, the content of tetrahydrofuran is determined by a headspace gas chromatography: placing a certain amount of a sample in a liquid nitrogen biological container for 5 minutes and taking the sample out for smashing and screening to obtain a product with 30 to 40 meshes, and then weighing a certain amount of the product; a 7890A type gas chromatograph produced by Agilent Technologies Co., Ltd being used, a DB-WAX type gas chromatographic column produced by Agilent Technologies Co., Ltd being used as a chromatographic column, and a 7697 type headspace sample injector produced by Agilent Technologies Co., Ltd being used for sample injection; with a condition for headspace sample injection of 100° C., carrying out the sample injection after the sample is kept constant for four hours; and calibrating a working curve with a solution of tetrahydrofuran/methanol.

When the content of tetrahydrofuran is more than 500 ppm based on the total weight of the glass fiber-reinforced flame retardant PBT composition, poor surface appearance would be resulted in.

Preferably, based on the total weight of the glass fiber-reinforced flame retardant PBT composition, the content of tetrahydrofuran is less than/equal to 400 ppm and more than/equal to 20 ppm; and more preferably less than/equal to 300 ppm and more than/equal to 30 ppm.

Particularly, the PBT resin has an intrinsic viscosity of 0.5 dl/g to 1.5 dl/g and a density of 1.30 g/cm$^3$ to 1.33 g/cm$^3$.

Particularly, the flame retardant is a mixture of a halogen flame retardant and a flame retardant synergist; the halogen flame retardant is selected from one or more of a brominated epoxy resin, a brominated polystyrene and decabromodiphenyl ethane; and the flame retardant synergist is selected from one or more of antimony trioxide, antimony pentaoxide and sodium antimonite.

Particularly, the glass fiber has a diameter of 5 μm to 15 μm.

The glass fiber-reinforced flame retardant PBT composition may further comprise 0 to 2 parts of an adjuvant, and the adjuvant is selected from one or more of an antioxidant, a light stabilizer, a lubricant, a toughener and a nucleating agent.

Suitable antioxidant may enhance a thermal-aging resistance of a material during processing and use, and generally it is selected from one or more complexes of a compound of phenols, a compound of phosphites and a compound of thioesters.

Suitable light stablizer may enhance a light-aging resistance of the material during use, and may be selected from one or more complexes of a compound of hindered amines, a compound of benzotriazoles and a compound of benzoxazinones.

Suitable lubricant is one or more complexes of stearates with a low molecular weight, metallic soaps (Cast, Znst), stearic complex esters or amides (erucamide).

Suitable nucleating agent is a long-chain linear saturated sodium carboxylate. Compared to a conventional nucleating agent (such as talcum powder), the long-chain linear saturated sodium carboxylate can not only enhance a crystallinity of the material but also generate a few small sphere crystals, so that mechanical properties of the PBT resin is optimized.

Suitable toughener is an ethylene-butyl methacrylate-glycidyl acrylate terpolymer, ethylene-methacrylate bipolymer and the like.

A preparation method for the above-described glass fiber-reinforced flame retardant PBT composition includes steps as follows:

a) preparing tetrahydrofuran and methylsiloxane into a solution of tetrahydrofuran/methylsiloxane with a mass fraction of 20 ppm to 1000 ppm; and b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

Compared to the prior art, the present invention has following beneficial effects:

in the present invention, when the content of tetrahydrofuran which is selected to be added in a formula of the glass fiber-reinforced flame retardant PBT composition, is less than/equal to 500 ppm and more than/equal to 10 ppm based on the total weight of the glass fiber-reinforced flame retardant PBT composition, a flowability and injection molding appearance of the glass fiber-reinforced flame retardant PBT composition can be apparently improved.

DETAILED DESCRIPTION OF THE PREFERRED EMBODIMENT

The present invention will be further described by specific implementations. Following embodiments are preferred implementations of the present invention, but the implementation of the present invention is not limited by the following embodiments.

Test Methods for Each Performance Index:

A test method for a content of tetrahydrofuran was a headspace gas chromatography: a certain amount of a sample was placed in a liquid nitrogen biological container for 5 minutes and taken out for smashing and screening to obtain a product with 30 to 40 meshes, and then a certain amount of the product was weighed; a 7890A type gas chromatograph produced by Agilent Technologies Co., Ltd was used, a DB-WAX type gas chromatographic column produced by Agilent Technologies Co., Ltd was used as a chromatographic column and a 7697 type headspace sample injector produced by Agilent Technologies Co., Ltd was used for sample injection; a condition for headspace sample injection was 100° C., the sample injection was carried out after the sample was kept constant for four hours; and a working curve was calibrated with a solution of tetrahydrofuran/methanol.

Tensile strength: test standard ISO527/2-93.

Notched Izod impact strength: test standard ISO180-2000.

Spiral length: an internal mold of Kingfa Sci. & Tech. Co., Ltd. was used, the spiral had a sectional size of 5 mm*2.5 mm, injection molding was performed with a constant injection molding pressure (50% pressure) and a constant speed (50% speed), and a longest length of the spiral to be injection molded was observed.

Appearance of an injection molded part: a 100 mm*100 mm*2 mm square panel was injection molded, and silver streaks on the square panel were visually measured. If a sum of the silver streaks was 0-2, the appearance of the injection molded part was defined as "excellent"; if a sum of the silver streaks was 3-4, the appearance of the injection molded part was defined as "good"; if a sum of the silver streaks was 5-6, the appearance of the injection molded part was defined as "fair"; and if a sum of the silver streaks was more than 6, the appearance of the injection molded part was defined as "poor".

Following raw materials were used in the embodiments of the present invention, but the present invention is not limited to these raw materials:

PBT resin: Kingfa Sci. & Tech. Co., Ltd., under a designation PBT-1, with an intrinsic viscosity of 1.0 dl/g, and a density of 1.31 g/cm$^3$;

Flame retardant: halogen flame retardant: brominated epoxy resin, Woojin Korea, under a designation CXB-2000H; and brominated polystyrene, Albemarle USA, under a designation SAYTEX 621;

flame retardant synergist: antimony trioxide, Hanfeng Chemical Shanghai;

Glass fiber: Jushi Group, diameter of 10 μm, ER-13;

Tetrahydrofuran: Jinan Yuanmao Chemical Co., Ltd.;

Adjuvant: antioxidant 1010, Ciba Switzerland, under a designation Irganox 1010;

OP wax: Shanghai Jiazhuo Chemical.

Embodiments 1-9 and Comparative Examples 1-9: Preparation of Glass Fiber-Reinforced Flame Retardant PBT Compositions Tetrahydrofuran and methylsiloxane were prepared into a solution of tetrahydrofuran/methylsiloxane with a mass fraction of 20 ppm to 1000 ppm; according to formulas in Table 1, the solution of tetrahydrofuran/methylsiloxane was mixed with the PBT resin, the flame retardant and the adjuvant in a high-speed mixer for 1 to 2 minutes to obtain a premix, and the premix was melt and extruded at 220° C. to 240° C. in a double-screw extruder, side-fed with the glass fiber, cooled and pelletized to obtain the glass fiber-reinforced flame retardant PBT composition; wherein each screw barrel temperature of the double-screw extruder (from a feeding mouth to a die) was: 140° C., 220° C., 230° C., 240° C., 240° C. and 220° C., respectively, a screw speed was 300 r/min, and a feeding amount was 50 kg/h.

TABLE 1

Proportion of each component (parts by weight) and each performance test result of ments 1-9 and Comparative Examples 1-9

| component | | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|---|
| PBT resin | | 56 | 56 | 56 | 42 | 42 | 42 | 48 | 48 | 48 |
| flame retardant | brominated epoxy resin | 10 | 10 | 10 | | | | 12 | 12 | 12 |
| | brominated polystyrene | | | | 10 | 10 | 10 | | | |
| | antimony trioxide | 3 | 3 | 3 | 5 | 5 | 5 | 8 | 8 | 8 |
| glass fiber | | 30 | 30 | 30 | 40 | 40 | 40 | 20 | 20 | 20 |
| adjuvant | | 1 | 1 | 1 | 1 | 1 | 1 | 1 | 1 | 1 |
| tetrahydrofuran ppm | | 250 | 365 | 430 | 30 | 20 | 10 | 300 | 400 | 500 |
| tensile strength MPa | | 125 | 124 | 126 | 145 | 143 | 142 | 101 | 102 | 105 |
| notched impact strength kJ/m$^2$ | | 9 | 8.5 | 8.2 | 10.5 | 10.3 | 10 | 7.9 | 7.6 | 7.4 |
| length of spiral/mm | | 300 | 410 | 430 | 290 | 281 | 275 | 380 | 400 | 490 |
| appearance of the injection molded part | | excellent | good | fair | excellent | good | good | excellent | good | fair |

| component | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| PBT resin | | 56 | 56 | 56 | 42 | 42 | 42 | 48 | 48 | 48 |
| flame retardant | brominated epoxy resin | 10 | 10 | 10 | | | | 12 | 12 | 12 |
| | brominate polystyrene | | | | 10 | 10 | 10 | | | |
| | antimony trioxide | 3 | 3 | 3 | 5 | 5 | 5 | 8 | 8 | 8 |
| glass fiber | | 30 | 30 | 30 | 40 | 40 | 40 | 20 | 20 | 20 |
| adjuvant | | 1 | 1 | 1 | 1 | 1 | 1 | 1 | 1 | 1 |
| tetrahydrofuran ppm | | 5 | 550 | 0 | 600 | 3 | 530 | 527 | 7 | 585 |
| tensile strength MPa | | 121 | 128 | 120 | 148 | 139 | 146 | 106 | 100 | 108 |
| notched impact strength kJ/m$^2$ | | 8.3 | 9.5 | 8.2 | 11 | 9.8 | 10.8 | 8.0 | 7.0 | 8.1 |
| length of spiral/mm | | 255 | 510 | 250 | 535 | 251 | 500 | 495 | 258 | 520 |
| appearance of the injection molded part | | good | poor | good | poor | good | poor | poor | good | poor |

It can be seen from the comparison of Embodiments 1-9 and Comparative Examples 1-9 that, in the present invention, when the content of tetrahydrofuran which was selected to be added in the formula of the glass fiber-reinforced flame retardant PBT composition, was less than/equal to 500 ppm and more than/equal to 10 ppm based on the total weight of the glass fiber-reinforced flame retardant PBT composition, a flowability and injection molding appearance of the glass fiber-reinforced flame retardant PBT composition could be apparently improved. When tetrahydrofuran was less than 10 ppm, it showed a poor flowability, such as Comparative Examples 1, 3, 5 and 8; and when tetrahydrofuran was more than 500 ppm, it showed a good flowability but poor appearance, such as Comparative Examples 2, 4, 6, 7 and 9.

What is claimed is:

1. A glass fiber-reinforced flame retardant PBT composition, comprising following components in parts by weight:

| | |
|---|---|
| a PBT resin | 35 to 71 parts; |
| a flame retardant | 5 to 30 parts; and |
| a glass fiber | 5 to 50 parts, | a content of tetrahydrofuran less than/equal to 500 ppm and more than/equal to 10 ppm based on a total weight of the glass fiber-reinforced flame retardant PBT composition; and wherein, flowability and injection molding appearance of the glass fiber-reinforced flame retardant PBT composition is improved as compared to when the content of tetrahydrofuran is more than 500 ppm based on the total weight of the glass fiber-reinforced flame retardant PBT composition, wherein the PBT resin has an intrinsic viscosity of 0.5 dl/g to 1.5 dl/g and a density of 1.30 g/cm$^3$ to 1.33 g/cm$^3$.

2. The glass fiber-reinforced flame retardant PBT composition according to claim 1, wherein the flame retardant is a mixture of a halogen flame retardant and a flame retardant synergist; the halogen flame retardant is selected from one or more of a brominated epoxy resin, a brominated polystyrene and decabromodiphenyl ethane; and the flame retardant synergist is selected from one or more of antimony trioxide, antimony pentaoxide and sodium antimonite.

3. The glass fiber-reinforced flame retardant PBT composition according to claim 1, wherein the glass fiber has a diameter of 5 μm to 15 μm.

4. The glass fiber-reinforced flame retardant PBT composition according to claim 1, wherein it further comprises 1 to 2 parts of an adjuvant, and the adjuvant is selected from one or more of an antioxidant, a light stabilizer, a lubricant, a toughener and a nucleating agent.

5. The glass fiber-reinforced flame retardant PBT composition according to claim 1, wherein the glass fiber-reinforced flame retardant PBT composition comprises the following components in parts by weight:

| | |
|---|---|
| the PBT resin | 40 to 57 parts; |
| the flame retardant | 9 to 23 parts; and |
| the glass fiber | 10 to 40 parts; | wherein, the content of tetrahydrofuran is determined by a headspace gas chromatography: placing a certain amount of a sample in a liquid nitrogen biological container for 5 minutes and taking the sample out for smashing and screening to obtain a product with 30 to 40 meshes, and then weighing a certain amount of the product.

6. The glass fiber-reinforced flame retardant PBT composition according to claim 5, wherein the flame retardant is a mixture of a halogen flame retardant and a flame retardant synergist; the halogen flame retardant is selected from one or more of a brominated epoxy resin, a brominated polystyrene and decabromodiphenyl ethane; and the flame retardant synergist is selected from one or more of antimony trioxide, antimony pentaoxide and sodium antimonite.

7. The glass fiber-reinforced flame retardant PBT composition according to claim 5, wherein the glass fiber has a diameter of 5 μm to 15 μm.

8. The glass fiber-reinforced flame retardant PBT composition according to claim 5, wherein it further comprises 1 to 2 parts of an adjuvant, and the adjuvant is selected from one or more of an antioxidant, a light stabilizer, a lubricant, a toughener and a nucleating agent.

9. The glass fiber-reinforced flame retardant PBT composition according to claim 5, wherein based on the total weight of the glass fiber-reinforced flame retardant PBT composition, the content of tetrahydrofuran is less than/equal to 400 ppm and more than/equal to 20 ppm.

10. A preparation method for the glass fiber-reinforced flame retardant PBT composition according to claim 1, characterized in that, the preparation method includes following steps:
a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

11. A preparation method for the glass fiber-reinforced flame retardant PBT composition according to claim 5, characterized in that, the preparation method includes following steps:
a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

12. A preparation method for the glass fiber-reinforced flame retardant PBT composition according to claim 9, characterized in that, the preparation method includes following steps:
a) preparing tetrahydrofiiran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofiiran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

13. A preparation method for the glass fiber-reinforced flame retardant PBT composition according to claim 2, characterized in that, the preparation method includes following steps:
a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

14. A preparation method for the glass fiber-reinforced flame retardant PBT composition according to claim 3, characterized in that, the preparation method includes following steps:
a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

15. A preparation method for the glass fiber-reinforced flame retardant PBT composition according to claim 4, characterized in that, the preparation method includes following steps:
a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

16. A preparation method for the glass fiber-reinforced flame retardant PBT composition according to claim 6, characterized in that, the preparation method includes following steps:
   a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
   b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

17. A preparation method for the glass fiber-reinforced flame retardant PBT composition according to claim 7, characterized in that, the preparation method includes following steps:
   a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
   b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

18. A preparation method for the glass fiber-reinforced flame retardant PBT composition according to claim 8, characterized in that, the preparation method includes following steps:
   a) preparing tetrahydrofuran and methylsiloxane into a solution of tetrahydrofuran/methylsiloxane, wherein a mass fraction of tetrahydrofuran in the solution of tetrahydrofuran/methylsiloxane is 20 ppm to 1000 ppm; and
   b) mixing the solution of tetrahydrofuran/methylsiloxane with a PBT resin, a flame retardant and an adjuvant in a high-speed mixer for 1 to 2 minutes to obtain a premix, and the premix being melt and extruded at 220° C. to 240° C. in a double-screw extruder, side-fed with a glass fiber, cooled and pelletized to obtain the glass fiber-reinforced flame retardant PBT composition.

\* \* \* \* \*